United States Patent
Lavaine et al.

(10) Patent No.: US 12,187,400 B2
(45) Date of Patent: Jan. 7, 2025

(54) BEARING DEVICE, FOR POWER TRANSMISSION UNIT FOR AN AZIMUTH THRUSTER

(71) Applicant: Aktiebolaget SKF, Gothenburg (SE)

(72) Inventors: Pierre Lavaine, Alingsås (SE); Lars Kahlman, Partille (SE)

(73) Assignee: Aktiebolaget SKF, Gothenburg (SE)

( * ) Notice: Subject to any disclaimer, the term of this patent is extended or adjusted under 35 U.S.C. 154(b) by 468 days.

(21) Appl. No.: 17/711,102

(22) Filed: Apr. 1, 2022

(65) Prior Publication Data
US 2022/0315191 A1  Oct. 6, 2022

(30) Foreign Application Priority Data

Apr. 6, 2021 (DE) ......................... 102021203388.1

(51) Int. Cl.
  *B63H 23/32* (2006.01)
  *B63B 79/10* (2020.01)
  *B63H 5/125* (2006.01)
  *B63H 23/04* (2006.01)
  *B63H 23/34* (2006.01)
  *F16C 41/00* (2006.01)

(52) U.S. Cl.
  CPC .......... *B63H 23/321* (2013.01); *B63B 79/10* (2020.01); *B63H 5/125* (2013.01); *B63H 23/04* (2013.01); *B63H 23/34* (2013.01); *F16C 41/008* (2013.01); *B63H 2005/1256* (2013.01); *F16C 2233/00* (2013.01)

(58) Field of Classification Search
None
See application file for complete search history.

(56) References Cited

U.S. PATENT DOCUMENTS

2017/0328407 A1* 11/2017 Zaghi .................... F16C 41/008

FOREIGN PATENT DOCUMENTS

WO   WO-2023091202 A1 * 5/2023 ............... B60V 1/08
WO   WO-2024036412 A1 * 2/2024 ............... F16C 17/24

* cited by examiner

*Primary Examiner* — S. Joseph Morano
*Assistant Examiner* — Jovon E Hayes
(74) *Attorney, Agent, or Firm* — GARCIA-ZAMOR INTELLECTUAL PROPERTY LAW, LLC; Ruy Garcia-Zamor

(57) ABSTRACT

A bearing device providing at least one bearing, an acquisition device having at least one optical fiber attached at least partly to the bearing configured to measure at least one first parameter relative to the bearing, an optical interrogator coupled to the at least one optical fiber configured to process the at least one first parameter so as to obtain at least one second parameter, and having a transmitting antenna connected to the at least one optical fiber configured to process the at least one first parameter, and a receiving antenna cooperating with the transmitting antenna configured to send wirelessly the at least one second parameter.

10 Claims, 4 Drawing Sheets

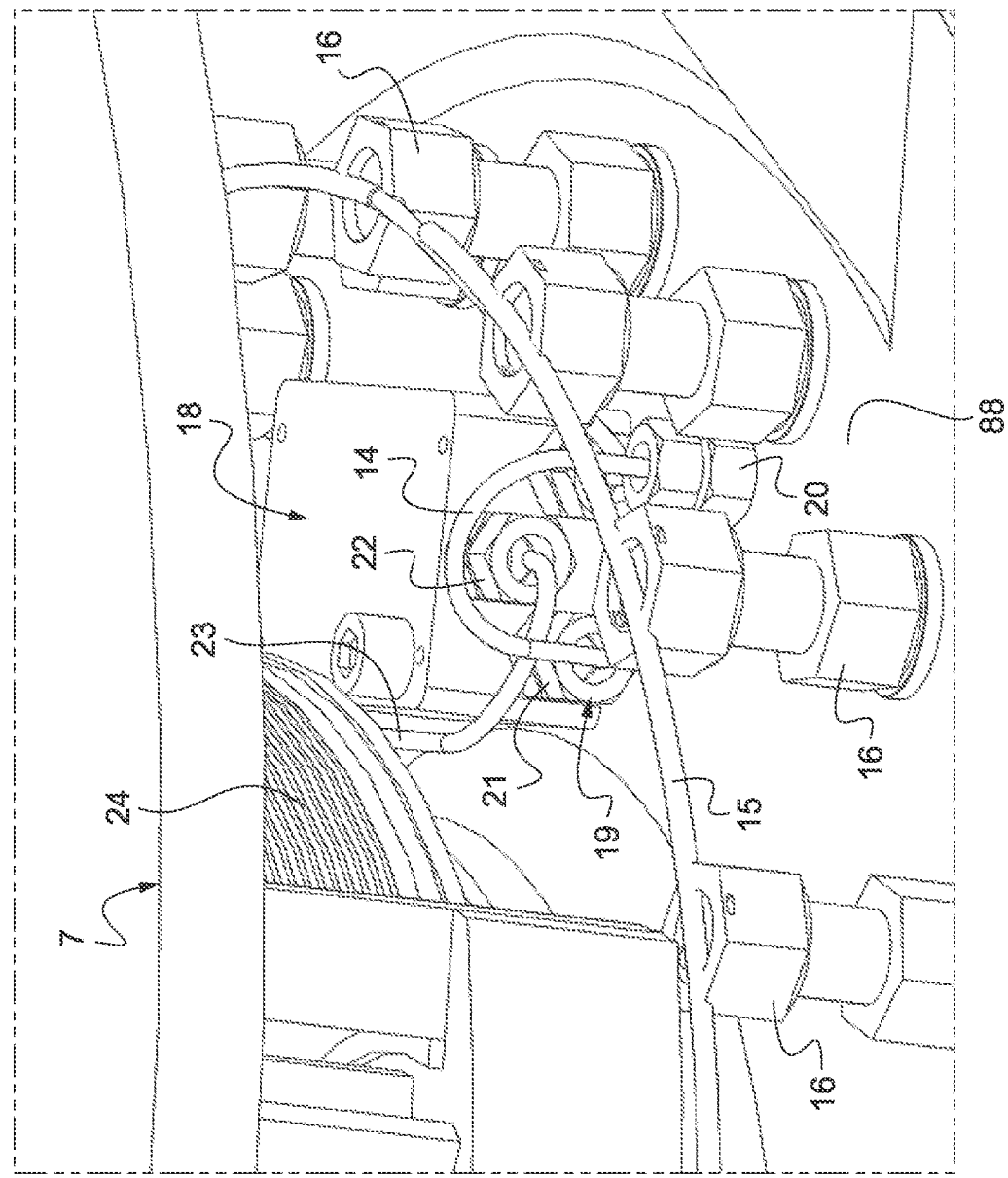

BEARING DEVICE, FOR POWER TRANSMISSION UNIT FOR AN AZIMUTH THRUSTER

CROSS-REFERENCE TO RELATED APPLICATIONS

This application claims priority to German Patent Application no. 102021203388.1, filed Apr. 6, 2021, the contents of which is fully incorporated herein by reference

TECHNICAL FIELD OF THE INVENTION

The present invention is directed to a method and system for monitoring a bearing. More particularly, the invention deals with a bearing device comprising at least one bearing to be monitored, a power transmission unit comprising such a bearing device, an azimuth thruster assembly for a vessel comprising such a power transmission unit, and a method for monitoring a bearing device.

BACKGROUND OF THE INVENTION

An azimuth thruster is usually used to provide vessels with better manoeuvrability. It has a lower part designed to move and to be positioned at any angle around a steering axis relative to the ship's hull.

It is further designed to guide the propeller and direct the propulsive flow of water.

Typically, there are two main variants of azimuth thrusters depending of the position of the thruster's engine.

As a first configuration, known as "electrical pod", an electric engine is connected directly to the gearless thruster.

In the second configuration, known as "Mechanical thruster", the engine is inside the vessel and is gear connected to the propeller placed under the ship's hull.

In order to ensure proper operation of the thruster, it is important to monitor the state of charge and other operating parameters of the thruster mechanical parts, especially in a harsh environment.

In the case of a bearing of the thruster, a load acting is measured by sensors mounted in the fixed ring of the bearing.

The sensors collect data and then transmit it to a distant receiver, for example via an antenna. This data has to be transported to a device usually located in the ship, configured to display and analyse the data.

Thus, the data has to pass through a closed chamber, known as "steering unit", with metal walls, partially or completely filled with a fluid such as oil or air. This is usually done by using an electrical slipring, which has limited capacity for transmitting a large amount of data.

In particular, signals are often transmitted with possible interference if high current is carried through the steering unit.

Wireless transmission could also be considered, however, because of the full rotation capacity of the thruster and as the radio signals are blocked by metal walls, the transmission can only be intermittent.

In addition, these sensors do not provide data transmission regardless of the azimuthal position of the thruster and the nature of the fluid.

SUMMARY OF THE INVENTION

Thus, the aim of the present invention is to measure at least one parameter of a bearing such as a physical quantity and transmit it consistently regardless of the environment through which the data flows.

For this purpose, it is provided a bearing device comprising:
at least one bearing,
acquisition means coupled to the bearing and configured to measure at least one first parameter relative to the bearing;
computing means configured to process the at least one first parameter so as to obtain at least one second parameter, and
transmission means configured to send wirelessly the at least one second parameter, characterized in that the acquisition means and the computing means are connected together with a cable link.

As the bearing device is generally contained in a closed casing made of metal, the cable link permits to transfer without interruption the first parameter to the acquisition means located in the casing.

The casing comprises for example a steering unit of an azimuth thruster assembly.

The transmission means are disposed in the casing such that a wireless communication outside the casing is possible.

Preferably, the acquisition means comprise at least one optical fiber attached at least partly to the bearing, and wherein the computing means comprises an optical interrogator coupled to the at least one optical fiber, the cable link comprising the at least one optical fiber.

Advantageously, the acquisition means comprise at least one strain gauge attached to the bearing, and wherein the computing means comprise a processing device connected to the strain gauge by the cable link connection.

Preferably, the transmission means comprise a transmitting antenna connected to the computing means and a receiving antenna cooperating with the transmitting antenna.

Advantageously, the at least one second parameter is the axial and/or the radial bearing load.

According to another aspect, a power transmission unit for an azimuth thruster is proposed.

The power transmission unit comprises a vertical shaft with a power input and with a power output, and comprising a bearing device according to any of the preceding claims, the at least one bearing supporting the vertical shaft.

Preferably, the power transmission unit further comprises an additional bearing supporting the vertical shaft and an additional acquisition means coupled to the additional bearing, the additional acquisition means and the computing means of the bearing device being connected together with an additional cable link, the at least one bearing of the bearing device being located between the power input and the additional bearing, and the additional bearing being located between the power output and the at least one bearing.

According to another aspect, an azimuth thruster assembly for a vessel is proposed.

The azimuth thruster assembly comprises:
at least one motor and at least one propeller;
a power transmission chain as defined below, provided between the at least one motor and the at least one propeller so as to rotate the propeller, the vertical shaft connecting the motor to the propeller, and
a steering unit containing at least partially a fluid, wherein the power transmission chain is arranged inside the steering unit.

Preferably, the fluid is oil or air.

According to another aspect, a method of monitoring a bearing device comprising at least one bearing is proposed.

The method comprises:
- measuring at least one first parameter relative to the at least one bearing with acquisition means of the bearing device coupled to the bearing,
- sending at least one first parameter of the bearing device to computing means through a cable link,
- processing the at least one parameter received through the cable link by computing means so as to obtain at least one second parameter and
- wirelessly sending the at least one second parameter by transmission means of the bearing device.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of a specific embodiment given by way of a non-limiting example and illustrated by the appended drawings on which.

DETAILED DESCRIPTION OF THE INVENTION

Figure 1:
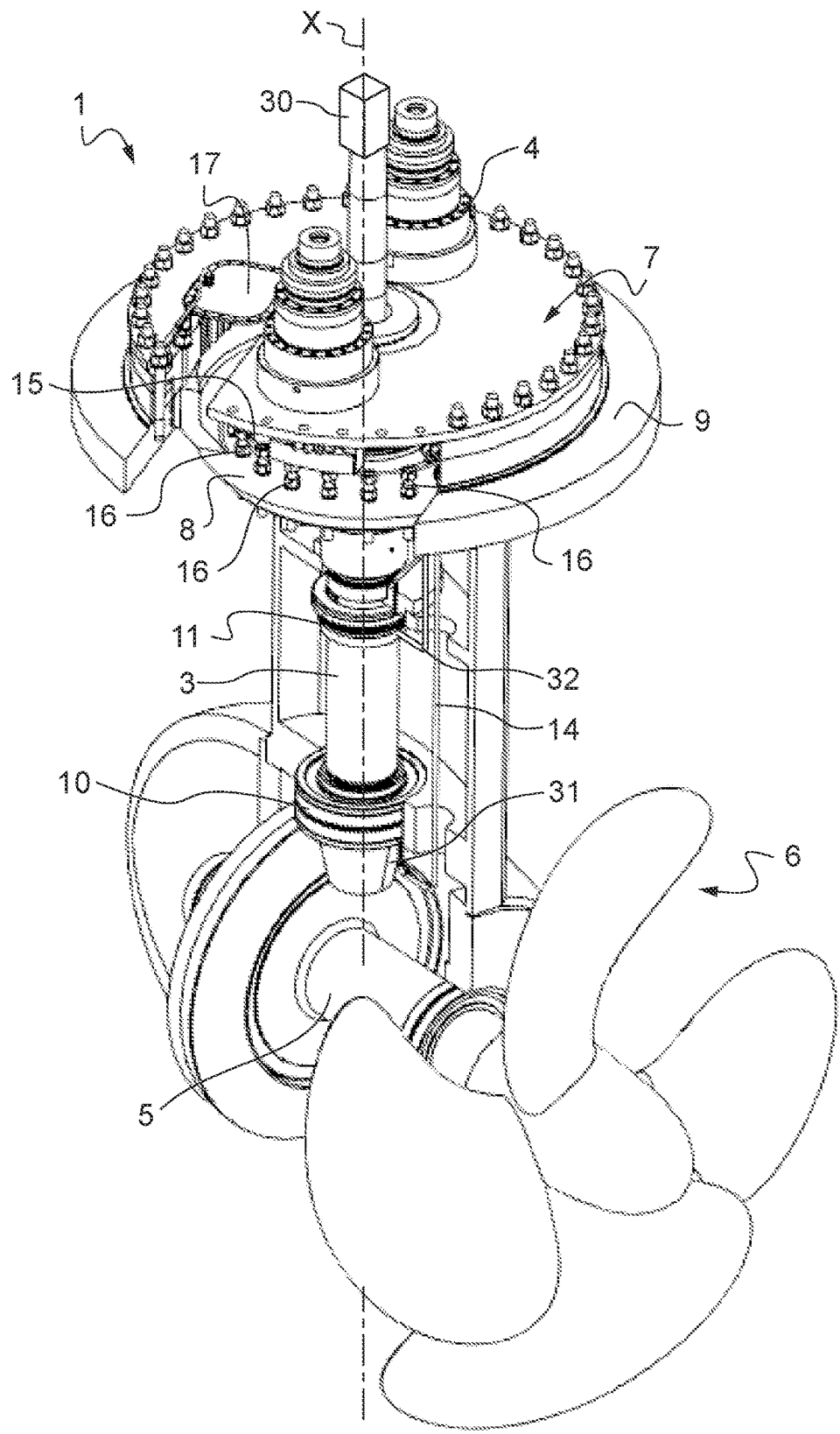
FIG. 1 schematically illustrates an azimuth thruster according to the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows a mechanical azimuth thruster assembly 1 wherein a motor 30 is inside a vessel and gear connected to the thruster 1 placed under the ship's hull.

The thruster 1 includes a power transmission unit comprising a vertical shaft 3 with a power input 4 and a power output 31, a horizontal output shaft 5, and a bearing device comprising a first bearing 10 and a second bearing 11.

The first bearing 10 is located between the power input 4 and the second bearing 11, and the second bearing 11 is located between the power output 31 and the first bearing 10.

In particular, the power input 4 has a first extremity coupled to the motor 30 and the power output 31 has a first extremity coupled to the horizontal output shaft 5.

The horizontal output shaft 5 has a second extremity coupled to a propeller 6 so as to drive it in rotation.

To support and guide in rotation the vertical shaft 3, the first bearing 10 and the second bearing 11 are arranged around the shaft 3.

The azimuth thruster assembly 1 further comprises a steering unit 7 containing at least partially a fluid, for example oil or air and containing the power transmission unit.

The bearing device further comprises first acquisition means coupled to the first bearing 10 to measure one first parameter relative to the first bearing 10 and second acquisition means coupled to the second bearing 11 to measure one first parameter relative to the second bearing 11.

In variant, the first and second acquisition means measure more than one first parameter.

The bearing device further comprises computing means 18 (not represented) to process the one first parameter of the first acquisition means and one first parameter of the second acquisition means so as to obtain respectively one second parameter and one third parameter.

The first acquisition means and the computing means 18 are connected together with a first cable link, the second acquisition means and the computing means 18 are connected together with a second cable link.

The bearing device further comprises transmission means to send wirelessly the one second parameter and the one third parameter.

In variant, only one of the first and second bearings comprises acquisition means connected to the computing means 18.

The first acquisition means comprise a first optical fiber 14 attached at least partly to the first bearing 10 and the computing means 18 comprises an optical interrogator 19 (not represented) coupled to the first optical fiber 14.

The first cable link comprises the first optical fiber 14.

The second acquisition means comprise a second optical fiber 32 attached at least partly to the second bearing 11.

The second cable link comprises the second optical fiber 32.

Due to the optical fibers, it is possible to collect a large amount of data in a short time.

In variant, the first acquisition means comprise at least one strain gauge attached to the first bearing 10, the second acquisition means comprise at least one strain gauge attached to the second bearing 11, and the computing means 18 comprise a processing device.

The processing device is connected to the strain gauge of the first acquisition means by a first wired connection, and is connected to the strain gauge of the second acquisition means by a second wired connection.

The first cable link comprises the first wired connection, and the second cable link comprises the second wired connection.

As the bearing device is in the steering unit 7, each cable link permits to transfer without interruption the first parameter of the first and second bearings 10, 11 to the acquisition means located in the casing.

Figure 2:
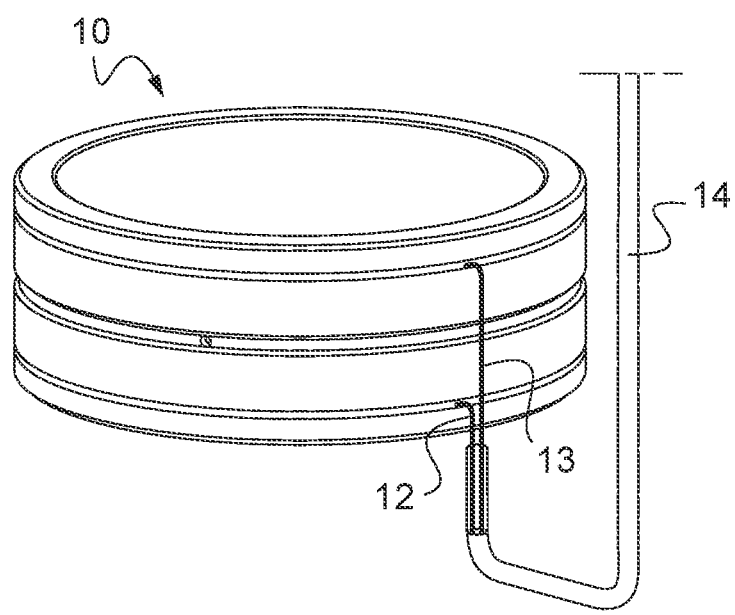
FIG. 2 is a schematic representation of a thruster bearing according to the invention and, FIGS. 3A and 3B show respectively a first partial view and a second partial view of the steering unit according to the invention.

As the first and second bearings 10, 11 have the same architecture, only the first bearing 10 is illustrated in FIG. 2.

FIG. 2 illustrates the first bearing 10, an optical fiber 14 comprises an optical cable and optical wires 12, 13 that surround the bearing 10.

The optical fiber 14 incorporates in this example at least one optical sensor.

Of course, there can be only one optical wire or more than two optical wires. The number of optical wires depends on the desired value accuracy of a first parameter to be measured in the bearing.

As optical wires 12 and 13 are in a hot environment that contains a fluid such as oil, it is advantageous to protect them from a possible alteration.

Therefore, the optical wires 12 and 13 are enclosed in at least one optical fiber 14 sheathed by the cable made of polyurethane or any other material capable of protecting the optical wires 12, 13 in such environment.

There may be several optical fiber 14. For example, it is possible to put only one optical wire in each optical fiber 14 or each group of optical wires into an optical fiber 14.

The optical fiber 14 is thereafter inserted into a steering unit 7 which has a fixed part, known as mounting flange or mounting module 9, and a first internal surface 8 which is a rotating floor as illustrated in FIG. 1.

The transmitting means comprise a transmitting antenna, for example a circular transmitting antenna 15, placed on the rotating floor 8.

The circular transmitting antenna 15 can also be placed on a plurality of elevating supports 16, such as studs, surrounding the rotating floor 8 and used to fasten the steering unit 7 to the thruster 1.

In other words, the circular transmitting antenna 15 is inside the steering unit 7.

By mounting the circular transmitting antenna 15 on the elevating supports 16, signal attenuation is limited.

The steering unit 7 further comprises a removable outer surface 17 located in front of the rotating floor 8.

More precisely, the outer surface 17 comprises a hole suitable for coupling an ethernet cable for example to another device inside the steering unit 7.

FIG. 3A partially illustrates the steering unit 7 and more precisely the computing means 18 to process the one first parameter of the first acquisition means and one first parameter of the second acquisition means, for example light carried by the first optical fiber 14 and the second optical fiber 31, and to obtain as output the one second and the one third parameter.

The one second and the one third parameter may comprise the axial and/or the radial bearing load of the first and second bearings 10, 11.

The one second and the one third parameter may comprise the temperature of the first and second bearings 10, 11.

In variant, the one second and the one third parameter may comprise the amount of water in oil of the steering unit 7.

The computing means 18 here comprise the optical interrogator positioned on the rotating floor 8, with an input 19 coupled to the first optical fiber 14 and the second optical fiber 31.

Of course, the number of interrogator inputs 19 depends on the number of optical fibers 14, 31.

The interrogator is here an optical transceiver adapted to receive the first parameter from the first optical fiber 14 and from the second optical fiber 31, as light, that is processed so as to obtain at least the second parameter and the third parameter as an output.

The interrogator is coupled to the circular transmitting antenna 15 and provides a first WIFI bridge which transmits wirelessly the second parameter as a signal.

However, to ensure that no fluid is exchanged between the steering unit 7 and the thruster's surroundings, a first sealing gland 20 is positioned on the rotating floor 8 in order to introduce the optical fiber 14 inside the steering unit 7.

A second sealing gland 21 is also mounted on a first external surface of the interrogator adapted to couple the optical fiber 14 to the input 19 of the interrogator.

There is further a third sealing gland 22 disposed on a second external surface of the interrogator distinct from it first external surface.

As illustrated, the sealing gland 22 connects an electrical slipring 24 of the steering unit 7 to the interrogator.

The electrical slipring 24 supplies in electrical energy the interrogator via a cable 23.

As a variant, the sealing gland 22 connects an external low voltage power supply to the interrogator.

Of course, it is possible to supply in electrical energy the interrogator by combining the external low voltage power supply and the electrical energy from the electrical slipring 24.

Figure 3B:
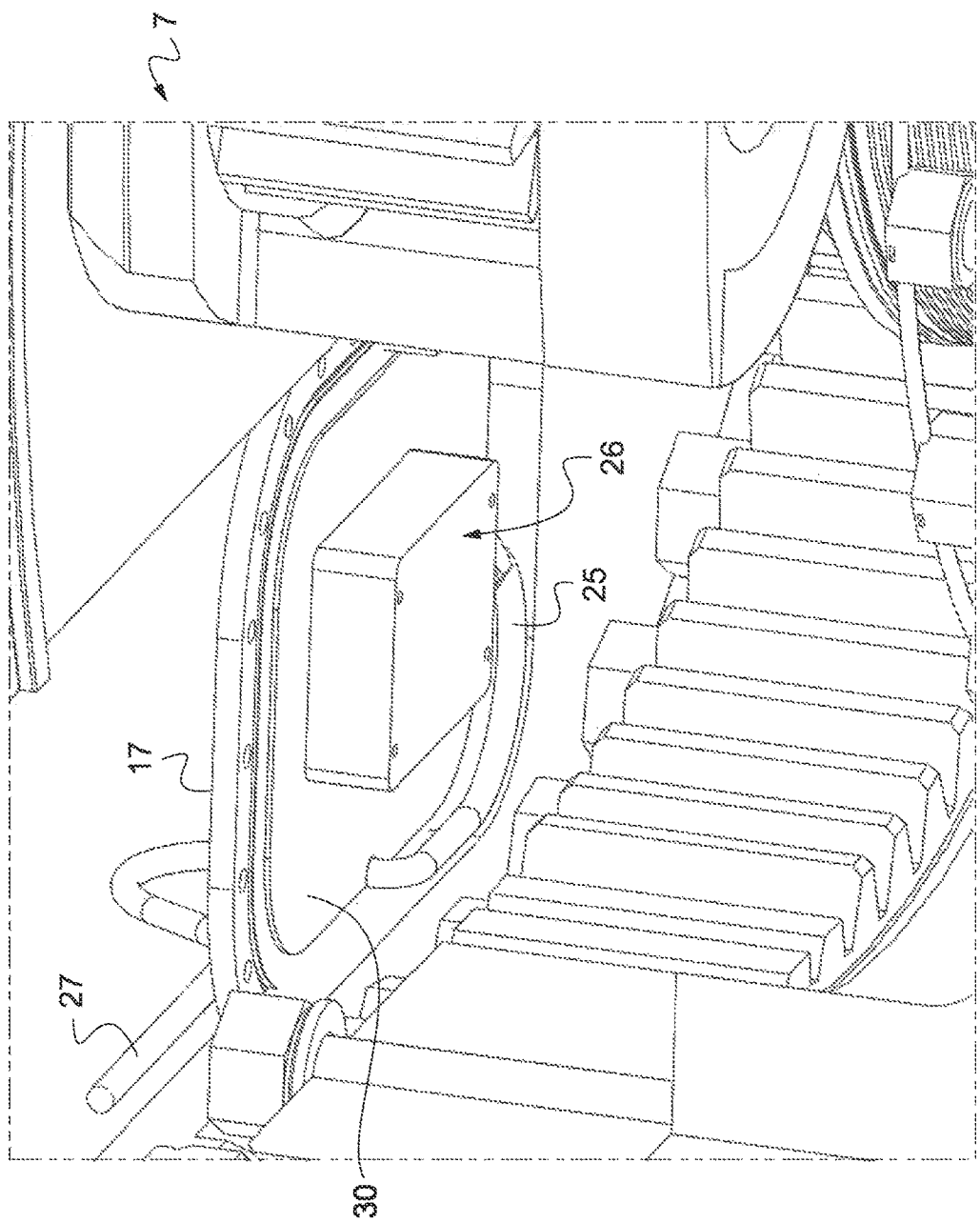

As shown in FIG. 3B which partially illustrates the steering unit 7, the thruster 1 comprises a receiving antenna 26, held in position by fastening means nonvisible in the figure.

The receiving antenna 26 is configured to receive wirelessly the second parameter from the circular transmitting antenna 15.

The transmitting antenna 15 and the receiving antenna 26 are inside the steering unit 7 and more particularly inside casing of the steering unit 7.

The receiving antenna 26 is located on a second internal surface 30 of the steering unit 7 that faces the first internal surface 8 according to a longitudinal axis X of the thruster assembly 1.

Due to this configuration, there is always a part of the circular antenna 15 that is in a direct view of the receiving antenna 26.

In addition, by mounting the circular transmitting antenna 15 on the elevating supports 16, the distance between the circular transmitting antenna 15 and the receiving antenna 26 is reduced. Thus, signal attenuation is limited.

The receiving antenna 26 further provides a second WIFI bridge to send, in data form, the second parameter wirelessly to a computer or any monitor capable of displaying and/or processing the data.

Alternatively, an ethernet cable 25 can be coupled to the receiving antenna 26 to transmit the data.

For this purpose, a fourth sealing gland is arranged on the outer surface 17 in order to extract the cable 25 from the steering unit 17.

The invention is not limited to these embodiments but comprises all the variants. For example, the azimuth thruster 1 can be adapted to be used in aircrafts or in space rockets.

The invention claimed is:

1. A bearing device comprising:
   at least one bearing,
   acquisition means coupled to the bearing and configured to measure at least one first parameter relative to the bearing;

computing means configured to process the at least one first parameter to obtain at least one second parameter, and transmission means configured to send wirelessly the at least one second parameter, characterized in that the acquisition means and the computing means are connected together with a cable link.

2. The bearing device according to claim 1, wherein the acquisition means comprise at least one optical fiber attached at least partly to the bearing, and wherein the computing means comprises an optical interrogator coupled to the at least one optical fiber, the cable link comprising the at least one optical fiber.

3. The bearing device according to claim 1, wherein the acquisition means comprise at least one strain gauge attached to the bearing, and wherein the computing means comprise a processing device coupled to the strain gauge by a wired connection, the cable link comprising the wired connection.

4. The bearing device according to claim 1, wherein the transmission means comprise a transmitting antenna connected to the computing means and a receiving antenna cooperating with the transmitting antenna.

5. The bearing device according to claim 1, wherein the at least one second parameter is the axial and/or the radial bearing load.

6. A power transmission unit for an azimuth thruster comprising a vertical shaft with a power input and with a power output, and comprising:

a bearing device providing at least one bearing, acquisition means coupled to the bearing and configured to measure at least one first parameter relative to the bearing; computing means configured to process the at least one first parameter to obtain at least one second parameter, and transmission means configured to send wirelessly the at least one second parameter, wherein the acquisition means and the computing means are connected together with a cable link, and wherein the at least one bearing supporting the vertical shaft.

7. The power transmission unit according to claim 6, further comprising an additional bearing supporting the vertical shaft and an additional acquisition means coupled to the additional bearing, the additional acquisition means and the computing means of the bearing device being connected together with an additional cable link, the at least one bearing of the bearing device being located between the power input and the additional bearing, and the additional bearing being located between the power output and the at least one bearing.

8. An azimuth thruster assembly for a vessel, comprising:
at least one motor and at least one propeller;
a power transmission unit including a vertical shaft with a power input and with a power output, and comprising:
a bearing device providing at least one bearing, acquisition means coupled to the bearing and configured to measure at least one first parameter relative to the bearing; computing means configured to process the at least one first parameter so as to obtain at least one second parameter, and transmission means configured to send wirelessly the at least one second parameter, wherein the acquisition means and the computing means are connected together with a cable link, and wherein the at least one bearing supporting the vertical shaft, provided between the at least one motor and the at least one propeller to rotate the propeller, the vertical shaft connecting the motor to the propeller, and a steering unit containing at least partially a fluid, wherein the power transmission chain is arranged inside the steering unit.

9. The azimuth thruster assembly according to claim 8, wherein the fluid is oil or air.

10. A method of monitoring a bearing device comprising at least one bearing, the method comprising:

measuring at least one first parameter relative to the at least one bearing with acquisition means of the bearing device coupled to the bearing, sending at least one first parameter of the bearing device to computing means through a cable link, processing the at least one parameter received through the cable link by computing means to obtain at least one second parameter and wirelessly sending the at least one second parameter by transmission means of the bearing device.

* * * * *